United States Patent [19]

Gaebele

[11] Patent Number: 5,782,065
[45] Date of Patent: Jul. 21, 1998

[54] LOADING AND UNLOADING DEVICE FOR X-RAY FILM CASSETTES

[75] Inventor: Frank Gaebele, Ostfildern, Germany

[73] Assignee: Eastman Kodak Company, Rochester, N.Y.

[21] Appl. No.: 840,311

[22] Filed: Apr. 11, 1997

[30] Foreign Application Priority Data

Jun. 22, 1996 [DE] Germany ............... 196 25 085.4

[51] Int. Cl.$^6$ .................. G03B 42/04; B65B 57/00
[52] U.S. Cl. ................. 53/504; 53/50; 53/168; 53/493; 53/501; 53/508
[58] Field of Search .............. 53/504, 500, 493, 53/495, 501, 508, 168, 238, 237, 50, 492

[56] References Cited

U.S. PATENT DOCUMENTS

| | | | |
|---|---|---|---|
| 4,480,423 | 11/1984 | Muller | 53/266.1 |
| 4,539,794 | 9/1985 | Azzaroni | 53/238 X |
| 5,087,024 | 2/1992 | Sachs et al. | 271/11 |
| 5,150,140 | 9/1992 | Kitazawa | 354/145.1 |
| 5,255,304 | 10/1993 | Uffinger et al. | 378/181 |
| 5,271,708 | 12/1993 | Nagel | 53/168 X |
| 5,297,376 | 3/1994 | Taguchi et al. | 53/504 |
| 5,402,997 | 4/1995 | Scholpple et al. | 271/145 |
| 5,428,659 | 6/1995 | Renner et al. | 378/162 |
| 5,556,086 | 9/1996 | Munneke et al. | 53/504 X |

FOREIGN PATENT DOCUMENTS 37 05 851-A1   9/1988   Germany.

*Primary Examiner*—James F. Coan
*Attorney, Agent, or Firm*—Peyton C. Watkins

[57] ABSTRACT

The invention relates a loading and unloading device for x-ray film cassettes, said device being further developed in such a way that a number of exposed x-ray films having different formats can be haphazardly delivered to a storage place, and in such a way that the filling height (H) as well as the number of x-ray films in storage can be reliably measured. For this purpose, a light-tight storage magazine is positioned in the film conveyor track of the loading and unloading device, said magazine being provided with a single sensor which measures the number of films introduced into, and the height (H) of the stack of films present in the magazine.

10 Claims, 1 Drawing Sheet

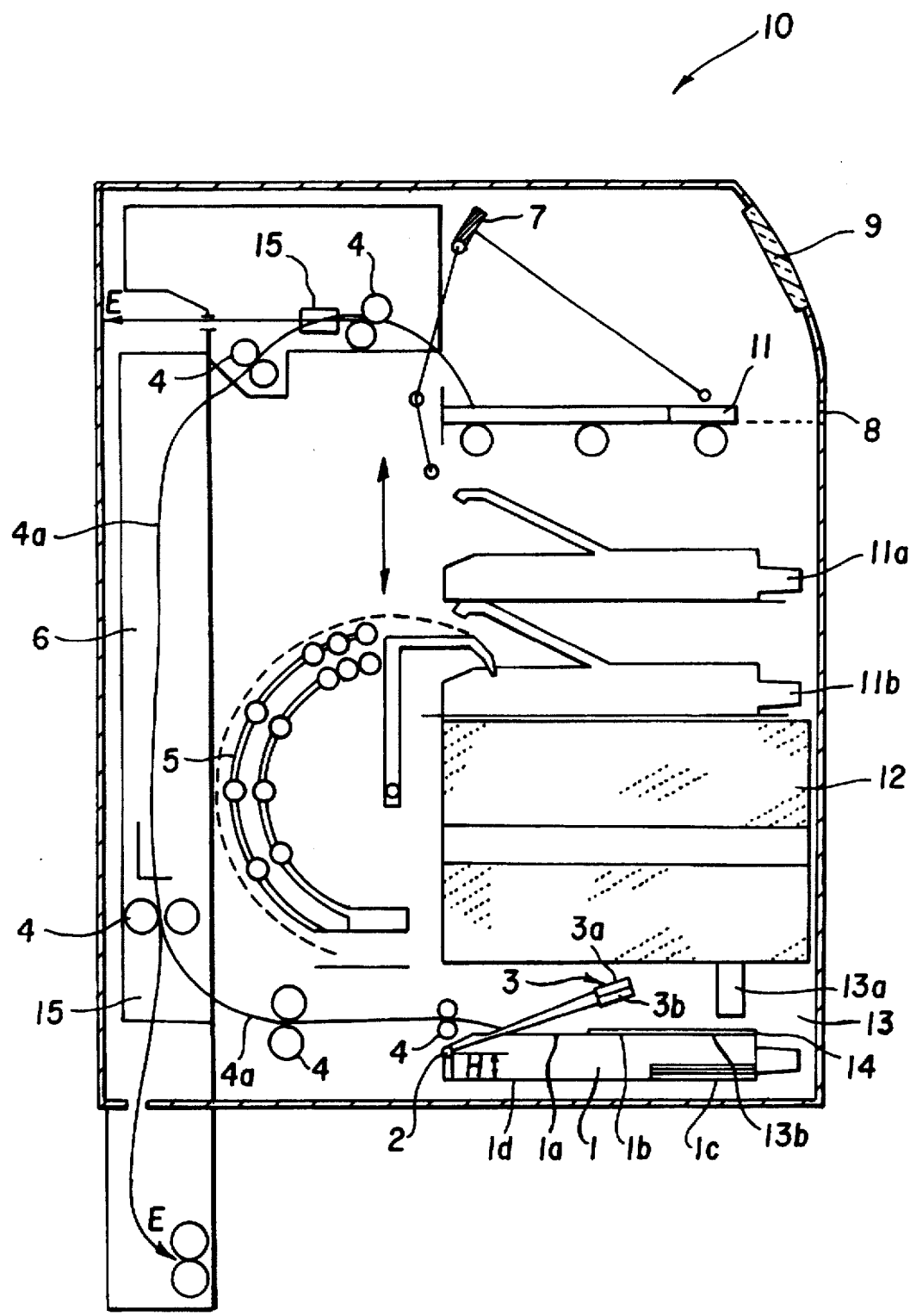

5,782,065

LOADING AND UNLOADING DEVICE FOR X-RAY FILM CASSETTES

FIELD OF THE INVENTION

The invention relates to a loading and unloading device for x-ray film cassettes, said device having a station for opening and closing a cassette introduced via a light-tight opening and having a loading and unloading system for unloading and transferring an exposed film to pairs of film transport rollers for transportation along a film conveyor track as well as for loading the cassette with a film from a number of film storage magazines, each having a film of a different format.

BACKGROUND OF THE INVENTION

A system of this type is known from DE-31 22 583 C2 and is characterized by a variety of magazine units of the same size which can be introduced into a rack and by a variety of magazine units of the same size which can be loaded into the storage magazines. The rack is also provided with a further processing unit which serves to receive a storage magazine. Thus, a film delivered by means of a loading or unloading device from an x-ray film cassette can either be directly introduced into a developing machine coupled with the system or it can be introduced into the storage magazine. The disadvantage of this system consists in that only films of the same format can be deposited in the storage magazine. If the cassette unloading station of the system delivers a film of a different format, then the storage magazine has to be changed or, alternatively, adjusted to suit the different format.

In some instances, however, for example, when problems with the developing machine occur or when no developing machine is used, it is desirable that a number of exposed films taken from the cassette delivered to the cassette loading and unloading station, be deposited in a single storage place in order that a separate system can later further process the films. In addition, it is desirable to unload the films from the cassettes regardless of their format and to be able to perform this in any sequence. The above-mentioned system, however, discloses no features which would render such usage possible.

In order to ensure that the above-described film storage magazine is completely emptied mechanically, it is necessary to know the exact number of films deposited there. The problem in this case, however, is that as a result of their different formats, the films in the storage magazine lie haphazardly and/or overlap; thus, the level to which the magazine is full will depend on the point of measurement.

SUMMARY OF THE INVENTION

It is the object of the present invention to further develop a loading and unloading device for x-ray film cassettes in such a way that exposed x-ray films of different formats can be haphazardly deposited and in such a way that the level to which the magazine is full and the number of x-ray films contained in the magazine can be accurately determined.

In accordance with one aspect of the present invention, the invention resides in loading and unloading device for x-ray film cassettes, said device having a station for opening and closing a cassette brought into the station via a light-tight opening, and said device also having a film loading and unloading system for unloading and transferring an exposed film to pairs of film transport rollers for transportation along a film conveyor track as well as for loading a cassette with a single film from a number of film storage magazines each of which contains a film of a different format, characterized in that in the film conveyor track of the loading and unloading device, a light-tight storage magazine for the unsorted collection of a variety of exposed x-ray films is provided in which the number of films deposited and the height of the film stack (H) is measured by means of a single sensor.

The present invention offers the advantage that no additional operational steps are required to deposit films of different formats into a storage magazine arranged in the loading and unloading device. It is no longer necessary to change the storage magazine when the film format in the cassette is changed. In addition, the storage magazine can be removed whenever so desired, replaced by a new one or, after removal, returned to the device without it being necessary to first empty the storage magazine.

In addition, the device can be operated with or without a developing machine.

Further details and advantages of the present invention can be found in the subclaims and in the description of an embodiment which is illustrated in the one and only Figure.

BRIEF DESCRIPTION OF THE DRAWINGS

FIG. 1 shows a schematic view of a cross-section through the device in accordance with the present invention.

PREFERRED EMBODIMENT OF THE INVENTION

The front side of a loading and unloading device 10 for x-ray film cassettes shows a light-tight opening 8 for the introduction of an x-ray film cassette 11. A station 7 serves to open and shut cassette 11 as well as to recognize the format of the film loaded into cassette 11 (see DE 40 37 378-A1 and DE 37 05 851-A1). A number of film storage cassettes 11a and 11b, and also a larger number than can be depicted, contain unexposed x-ray films each having a certain format. A loading and unloading device 5 can be moved both horizontally and vertically, as shown by the arrows in the Figure; in this way it is possible to remove an exposed film from cassette 11, and subsequently to transfer it to one of the pairs of film transport rollers 4, and it is likewise possible to remove an unexposed film from one of the storage magazines 11a and 11b. This step is chosen in accordance with the film format recognized by station 7. The individual elements of the loading and unloading device, including their methods of operation, such as transport of cassettes (DE 40 13 285), centering of cassettes (DE 40 23 185-A1), opening and closing of cassettes (DE 40 37 378-A1), and film removal device (DE 37 16 904-C2), film loading device (DE 37 05 851-C1) are explained in further detail in the cited publications; hence a detailed description of these aspects is not given here.

In accordance with the film format recognized in a prior step, the loading and unloading station 5 removes a film of the same format from one of the film storage magazines 11a or 11b and feeds it into cassette 11 which can be subsequently removed from loading and unloading device 10 via opening 8.

Deflectors 15 are provided within the film conveyor track 4a by means of which the films unloaded from cassette 11 can be directed in the direction of arrow E and supplied to a developing system (not shown). The developing system can be arranged behind, to the side of or under the loading and unloading device 10 and is connected to it by known means so as to be light-tight.

Depending on the arrangement of the developing machine within the loading and unloading device 10, one of the deflectors 15 is used to direct the film to the developing machine.

To receive the films from the cassette introduced via opening 8, a storage magazine 1 is provided into which films 1c are delivered without being sorted and aligned, that is according to the order in which they are unloaded from the cassettes. Storage magazine 1 can be introduced and/or removed via a light-tight opening (not-shown) located on the front side of the loading and unloading device 10, the cover 1b of the storage magazine 1 being provided with a device (likewise not shown) which effects opening of said cover upon insertion and light-tight closure upon removal.

A writing and reading unit 13, which is arranged, on the one hand, in a housing 13a and, on the other, in the wall 11b of the storage magazine 1, forms a capacitive or inductive coupling device which is provided with a signal processing device and a power supply (not shown). Via a control and display unit 9 which is connected with an electronical arrangement 12 and with the writing and reading unit 13, or via the electronical arrangement itself consisting of circuits known to an expert in the field, it is possible for data to be digitally transferred to, stored in and read out again from a storage arranged on the storage magazine 1. The coupling device and its function which is termed here as writing and reading unit 13, is described in detail in DE 42 08 347 A1 entitled "Device for transforming electrical signals and supply cables to a data storage of a cassette".

The electronical arrangement 12 also has cables (not shown) with which it connects the individual stations such as, for example, the opening for introducing the cassettes, station 7, loading and unloading station 5, and the individually motor-driven rollers (not shown) of the pairs of film transport rollers 4 and deflectors 15.

An infra-red sensor 3 consisting of a light-emitting element 3a and a light-receiving element 3b is positioned directly above the cassette opening 1a at a flat angle a to the opening for introducing the cassettes. A switch triggers the emission of infra-red light when storage magazine 1 has been completely introduced into the loading and unloading device 10. The sensor continues to emit light until the magazine 1 is removed from the device 10. A light ray sent by sensor element 3a hits a light-reflecting element 2 (cat's eye) which is arranged within the magazine 1 and which reflects the light ray under a small reflection angle onto the light-receiving element 3b of the sensor. The element 2 is hereby positioned at a distance of height H from bottom 1d of the storage magazine which corresponds to the maximum filling height of storage magazine 1. When the maximum filling height is reached, element 2 is covered resulting in a light ray deflection at the film surface of the top film in the storage magazine: this means that the light-receiving element 3b can no longer receive light.

The method of functioning of the device in accordance with the present invention wherein a storage magazine 1 is arranged in the loading and unloading device 10 and wherein sensor 3 emits infra-red light, can be described as follows:

After introduction of a film cassette 11 via opening 8, light-tight closure of this opening takes place. Determination of the format of the film located in the cassette proceeds via station 7. The cassette cover is thereafter opened and the exposed film removed from cassette 11 by means of the loading and unloading station 5 and then transferred to the pair of film transport rollers 4 positioned next to station 7.

Depending on the configuration of the device, one of the deflectors 15 is activated. The film is then transported along the film conveyor track 4a into either the developing machine or storage magazine 1. The path chosen is indicated by the control and display unit 9.

If the film is brought into the storage magazine 1, it is transported into it by means of the pairs of transport rollers 4 via the film transport shaft 6. During introduction of the film into magazine 1, the light ray emitted by sensor 3 is briefly interrupted and a counting pulse produced by the electronical arrangement 12 adds the number of interruptions to the light ray. The sum of the pulses, which corresponds to the number of films 1c introduced into storage magazine 1, is then transferred by the writing and reading device 13 to the semiconductor storage device 14 positioned on the storage magazine; this procedure occurs either when the films in the storage magazine 1 have attained the maximum filling height or the magazine was previously removed. In the latter instance, the transfer of the pulse is triggered by the previously mentioned switch which likewise activates or deactivates sensor 3. The number of pulses (corresponding to the number of films) is relayed to the semiconductor 14 belonging to magazine 1, and this procedure is analogous to the manner of operation of the signal processing device (including its corresponding signal receiving and emitting circuits) described in DE 42 08 347-A1.

If the storage magazine 1 is so full that the light-reflecting element 2 is covered by a film, then the light emitted by the sensor element 3a can no longer be received by sensor element 3b. This "permanent interruption", determined by a time interval of at least 20 seconds, can be measured by suitable circuits which are known to experts in the field. The electronical arrangement 12 thus recognizes whether the storage magazine 1 is filled to its maximum limit, or whether a film is being introduced into the magazine.

The loading of films into storage magazine 1 produces nonuniform overlapping and the films are not exactly aligned over one another; as a consequence, the maximum number of films may have been introduced into the magazine, although the light-reflecting element 2 is not yet covered by a film. Thus, the electronical arrangement is so designed that the number of films counted as having been introduced into the magazine serves primarily to lock opening 8. To this end, a circuitry is used which is likewise known to an expert in the field. Continued introduction of cassettes via opening 8 is therefore blocked until the storage magazine 1 is removed from the loading and unloading device 10. A pulse is sent to the electronical arrangement 12 via the above-mentioned switch and the moment this pulse is released, an internal counter resets the number of films to zero. If a storage magazine containing a certain number of films is subsequently introduced into the loading and unloading device, then the number of films stored in the semiconductor storage device of the storage magazine is read out by means of the writing and reading device 13 (see DE 42 08 347-A1) and the counter in the electronical arrangement 12 correspondingly reset. The storage magazine 1 can now be filled to the maximum level. The procedure for introducing an empty storage magazine into the loading and unloading device 10 is the same as that described above. The storage of magazine 1 is set at zero when emptying is performed: this step is carried out by a device not described herein.

It is also possible to operate the device without deflectors 15 and without using the developing machine whilst still remaining within the scope of the present invention.

Parts List
1 storage magazine
1a cassette opening
1b cover
1c films
1d bottom
2 light reflecting element
3 infra-red sensor
3a light emitting element
3b light-receiving element
4 film transport rollers
4a film conveyor track
5 loading and unloading device
6 film transport shaft
7 station
8 opening
9 display unit
10 loading and unloading device
11 film cassette
11a film storage magazines
11b film storage magazines
12 electronical arrangement
13 writing and reading unit
13a housing
13b wall
14 semiconductor storage device
15 deflectors

What is claimed is:

1. Loading and unloading device for x-ray film cassettes, said device having a station for opening and closing a cassette brought into the station via a light-tight opening, and said device also having a film loading and unloading system for unloading and transferring an exposed film to pairs of film transport rollers for transportation along a film conveyor track as well as for loading a cassette with a single film from a number of film storage magazines each of which contains a film of a different format, characterized in that in the film conveyor track of the loading and unloading device, a light-tight storage magazine for the unsorted collection of a variety of exposed x-ray films is provided in which the number of films deposited and the height of the film stack (H) is measured by means of a single sensor.

2. Loading and unloading device according to claim 1, characterized in that the sensor is placed directly in front of the film entry opening of the storage magazine, said sensor consisting of a light-emitting and light-receiving element arranged outside the storage magazine and of a light-reflecting element arranged within the storage magazine.

3. Loading and unloading device according to claim 1, characterized in that when introduced into the loading and unloading device the cover of the storage magazine uncovers the light-reflecting element for the reflection of light from the light-emitting element and in that when removed from the loading and unloading device, cover is closed so as to be light-tight.

4. Loading and unloading device according to claim 1, characterized in that elements are positioned opposite each other in such a way that during introduction of a film into the magazine, an electronical arrangement can determine the number of interruptions to the light rays between both elements and it can also determine when the maximum film stack height (H) is reached in the storage magazine.

5. Loading and unloading device according to claim 4, characterized in that the display unit shows and sends an optical and acoustical warning signal when the maximum film stack height (H) is reached, and this in turn will block the opening for the introduction of a cassette.

6. Loading and unloading device according to claim 4, characterized in that the number of films deposited in the storage magazine can be transferred by means of a writing and reading device to a semiconductor storage device positioned on the storage magazine.

7. Loading and unloading device according to claim 6, characterized in that the writing and reading device permits the number of films stored in the semiconductor storage device to be shown by the display unit.

8. Loading and unloading device according to claim 2, characterized in that the light-reflecting element is positioned at a distance from the bottom of the storage magazine, said distance corresponding to the maximum film stack height (H).

9. Loading and unloading device according to claim 1, characterized in that films deposited in the storage magazine have at least two different formats.

10. Loading and unloading device according to claim 1, characterized in that the film conveyor track has at least one deflector for directing the films either into a film processing system (E) or into the magazine.

* * * * *